(12) United States Patent
Cheng et al.

(10) Patent No.: US 11,301,413 B2
(45) Date of Patent: Apr. 12, 2022

(54) ENHANCED PCIE AUTO-BIFURCATION

(71) Applicant: Dell Products L.P., Round Rock, TX (US)

(72) Inventors: Che-Nan Cheng, New Taipei (TW); Chih-Yu Chan, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/783,562

(22) Filed: Feb. 6, 2020

(65) Prior Publication Data

US 2021/0248102 A1 Aug. 12, 2021

(51) Int. Cl.
*G06F 13/42* (2006.01)

(52) U.S. Cl.
CPC .. *G06F 13/4282* (2013.01); *G06F 2213/0026* (2013.01)

(58) Field of Classification Search
None
See application file for complete search history.

(56) References Cited

U.S. PATENT DOCUMENTS

| | | | |
|---|---|---|---|
| 2006/0252285 A1* | 11/2006 | Shen | G06F 13/409 439/43 |
| 2007/0255878 A1* | 11/2007 | Shen | G06F 13/409 710/300 |
| 2008/0212273 A1* | 9/2008 | Bechtolsheim | G06F 1/183 361/679.33 |
| 2013/0115819 A1* | 5/2013 | Liu | H01R 12/721 439/628 |
| 2014/0173140 A1* | 6/2014 | Bates | G06F 13/382 710/16 |
| 2014/0173410 A1* | 6/2014 | Marchesseault | G06F 40/169 715/233 |
| 2014/0201401 A1* | 7/2014 | Tokumitsu | G06F 13/36 710/104 |
| 2015/0120874 A1* | 4/2015 | Kim | H04L 67/1097 709/218 |
| 2015/0120971 A1* | 4/2015 | Bae | G06F 3/0658 710/106 |
| 2015/0205746 A1* | 7/2015 | Bailey | G06F 13/385 710/315 |
| 2018/0246833 A1* | 8/2018 | Bai | G06F 11/203 |

* cited by examiner

*Primary Examiner* — Henry Tsai
*Assistant Examiner* — Christopher A Bartels
(74) *Attorney, Agent, or Firm* — Jackson Walker L.L.P.

(57) ABSTRACT

An information handling system may include at least one processor; a slot configured to receive an information handling resource and couple the information handling resource to a communications bus of the information handling system; and a computer-readable medium having instructions thereon that are executable by the at least one processor. The instructions may be executable for determining logical states for a plurality of pins of the slot; based on the determined logical states, determining a communications width associated with an information handling resource received in the slot; and setting a bifurcation variable associated with the slot based on the determined communications width.

19 Claims, 5 Drawing Sheets

ENHANCED PCIE AUTO-BIFURCATION

TECHNICAL FIELD

The present disclosure relates in general to information handling systems, and more particularly to connections for information handling resources such as Peripheral Component Interconnect (PCI) or Peripheral Component Interconnect Express (PCIe) resources.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems include information handling resources (e.g., PCIe resources) that may have one or more automatic configuration abilities. For example, an Integrated I/O (IIO) module for a processor may support a number of PCIe lanes (e.g., 48) that can be configured as independent PCIe ports (e.g., up to 12). Therefore, a user may configure PCIe bifurcation settings for each PCIe slot that is connected to the IIO module of the processor to ensure that the PCIe devices that are installed in the PCIe slots will work properly. Some systems offer the capability to configure PCIe bifurcation settings and perform PCIe link training automatically.

In particular, port bifurcation for each of the ports within an IIO module may be configured via the system BIOS by programming a register such as PCIE_IOU_BIF_CTRL. When the BIOS programs the appropriate bifurcation information into the register, it can initiate port bifurcation by writing to the "start bifurcation" bit in the register. Once the BIOS has started the port bifurcation, it typically cannot initiate any more bifurcation commands without resetting the entire component. The bifurcation control registers may be "sticky" such that the BIOS may program the register and then cause a reset, and the appropriate bifurcation will then take effect upon exit from that reset.

However, some devices (particularly devices that may not implement specifications correctly) may cause issues in the context of automatic bifurcation. Accordingly, improved techniques for determining the correct lane bifurcation settings are desired.

It is to be noted that various elements discussed herein are described in the PCI Express® Base Specification Revision 5.0, published May 28, 2019 (hereinafter, PCIe Base Specification), which is hereby incorporated by reference in its entirety. One of ordinary skill in the art with the benefit of this disclosure will understand its applicability to other specifications (e.g., prior or successor versions of the PCIe Base Specification). Further, some embodiments may be applicable to different technologies other than PCIe.

Further, it should be noted that embodiments of this disclosure that are implemented in the PCIe context may remain fully compliant with the PCIe Base Specification, and need not violate any of its requirements.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with connections for information handling resources may be reduced or eliminated.

In accordance with embodiments of the present disclosure, an information handling system may include at least one processor; a slot configured to receive an information handling resource and couple the information handling resource to a communications bus of the information handling system; and a computer-readable medium having instructions thereon that are executable by the at least one processor. The instructions may be executable for determining logical states for a plurality of pins of the slot; based on the determined logical states, determining a communications width associated with an information handling resource received in the slot; and setting a bifurcation variable associated with the slot based on the determined communications width.

In accordance with these and other embodiments of the present disclosure, a method may include an information handling system receiving an information handling resource in a slot that is configured to couple the information handling resource to a communications bus of the information handling system; the information handling system determining logical states for a plurality of pins of the slot; based on the determined logical states, the information handling system determining a communications width associated with an information handling resource received in the slot; and the information handling system setting a bifurcation variable associated with the slot based on the determined communications width.

In accordance with these and other embodiments of the present disclosure, an article of manufacture may include a non-transitory, computer-readable medium having computer-executable code thereon that is executable by a processor for: in response to a slot coupled to the processor receiving an information handling resource in a slot that is configured to couple the information handling resource to a communications bus, determining logical states for a plurality of pins of the slot; based on the determined logical states, determining a communications width associated with an information handling resource received in the slot; and setting a bifurcation variable associated with the slot based on the determined communications width.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

Figure 1:
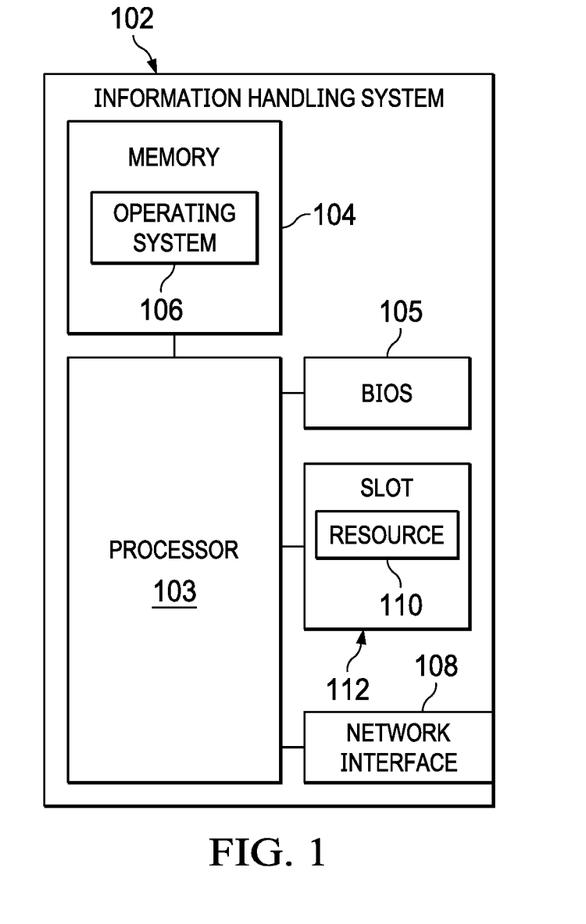
FIG. 1 illustrates a block diagram of an example information handling system, in accordance with embodiments of the present disclosure.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

One or more information handling resources 110 may also be present in information handling system 102. In some embodiments, information handling resources 110 may be coupled to one or more processors 103 via a connection such as a PCIe connection. As shown in FIG. 1, information handling resource 110 may be received in slot 112, which may be a PCIe slot (e.g., a slot capable of receiving ×1, ×4, ×8, ×16, etc. PCIe devices).

During the early stages of system boot, the PCIe root port(s) may establish links with all detected downstream devices, including the various information handling resources 110. Handshake signaling during hardware training may detect lane designations to determine whether the attached devices are communicating, and the link width in which they trained.

For most PCIe devices, a PCIe port may be able to recognize the device and establish a link between the device and the PCIe root port. The device may report a max width (e.g., ×16), and the system BIOS may then set the lane bifurcation to reflect an ×16 link.

However, in some instances (e.g., with devices that do not implement a feature such as PCIe Lane Reversal), the bifurcation configuration may fail. In addition, various special-purpose, prototype, or custom-built devices may also not be detected correctly when the system BIOS attempts to issue the command to recognize devices and check link widths before establishing the connection. In such an instance, no PCIe device may be found by the root port, and no link may be established. In these situations and others, existing automatic configuration processes may be in need of improvement.

In light of the above, various difficulties may arise in determining the correct bifurcation settings for information handling resources 110 (e.g., determining how many PCIe lanes should be assigned to the respective PCIe port through which each information handling resource 110 is connected).

Figure 2A:
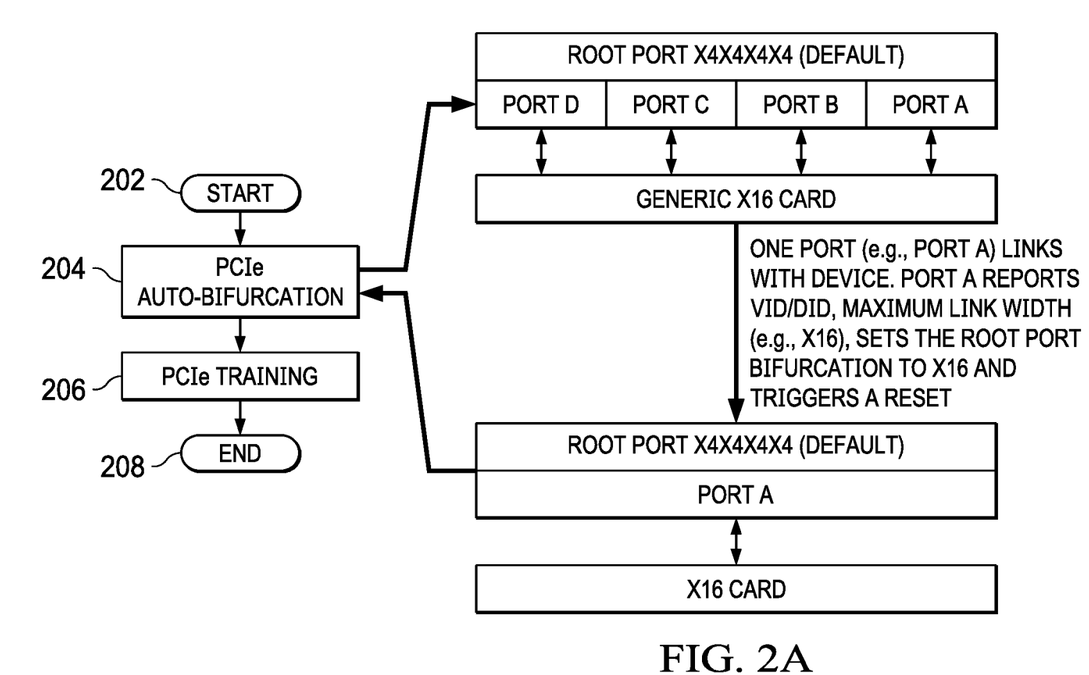
FIG. 2A illustrates a block diagram and flow chart of a successful auto-bifurcation process.

FIG. 2A provides an example in which PCIe automatic bifurcation detection works correctly, in a situation with four PCIe ports labeled A, B, C, and D. In general, a process may begin at step 202. At step 204, PCIe auto-bifurcation takes place. A BIOS default setting for PCIe slot bifurcation may initially be implemented such as ×4×4×4×4 (which indicates that the system first looks for a multi-function device on each of the ×4 links).

In the example shown in FIG. 2A, the PCIe auto-bifurcation process begins when an ×16 PCIe device is inserted into a PCIe slot. One of the four ports (e.g., port A) initially links with the device, reports the Vendor ID, the Device ID, and the maximum link width (e.g., ×16). Port A may then set the root port bifurcation to ×16 and reset. After the reset, PCIe training commences at step 206, and the ×16 link is correctly established with the device. The method ends at step 208.

Figure 2B:
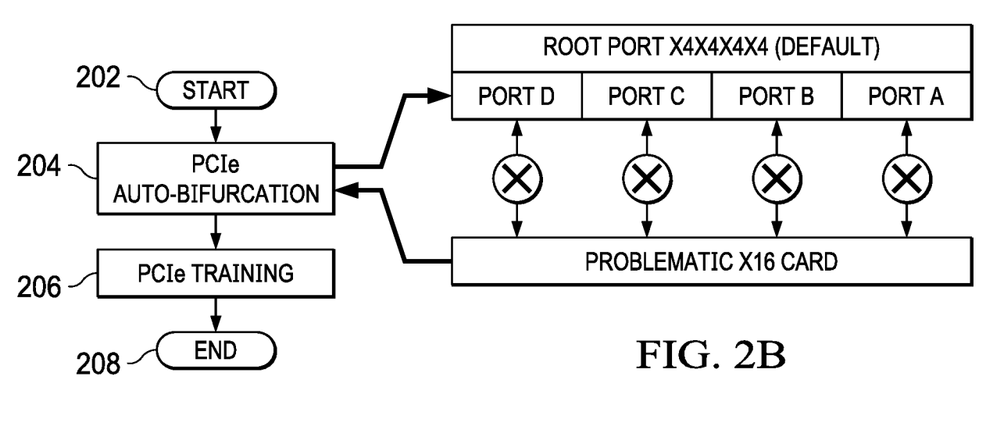
FIG. 2B illustrates a block diagram and flow chart of an unsuccessful auto-bifurcation process.

FIG. 2B illustrates a similar process, but in this example, step 204 fails. This may occur if PCIe Lane Reversal is not implemented by the device or if the device is otherwise problematic. The device may not be initiated, and lane renumbering may fail. Thus, in such a situation, none of the four ports recognize the device, and so no link is established. If the initial bifurcation were set to ×16, however, the embodiment of FIG. 2B would work correctly. Embodiments of this disclosure may enable such a default setting to be made prior to the initiation of the standard PCIe auto-bifurcation process.

Accordingly, some embodiments of this disclosure may include a new mechanism (e.g., implemented in the system BIOS) for determining what devices are present in the various slots, and what their lane widths should be. This may prevent problematic devices (e.g., devices that do not implement lane reversal or lane renumbering support) from failing the link negotiation. As discussed in more detail below, some embodiments may rely on detecting a signal on a specific pin (e.g., a pin corresponding to a PRSNT2# signal) in order to determine the link width for a device inserted into a slot. As one of ordinary skill in the art with the benefit of this disclosure, a PCIe slot may have a number of pins (e.g., B17, B31, B48, and B81) which correspond to the PRSNT2# signal.

Figure 3:
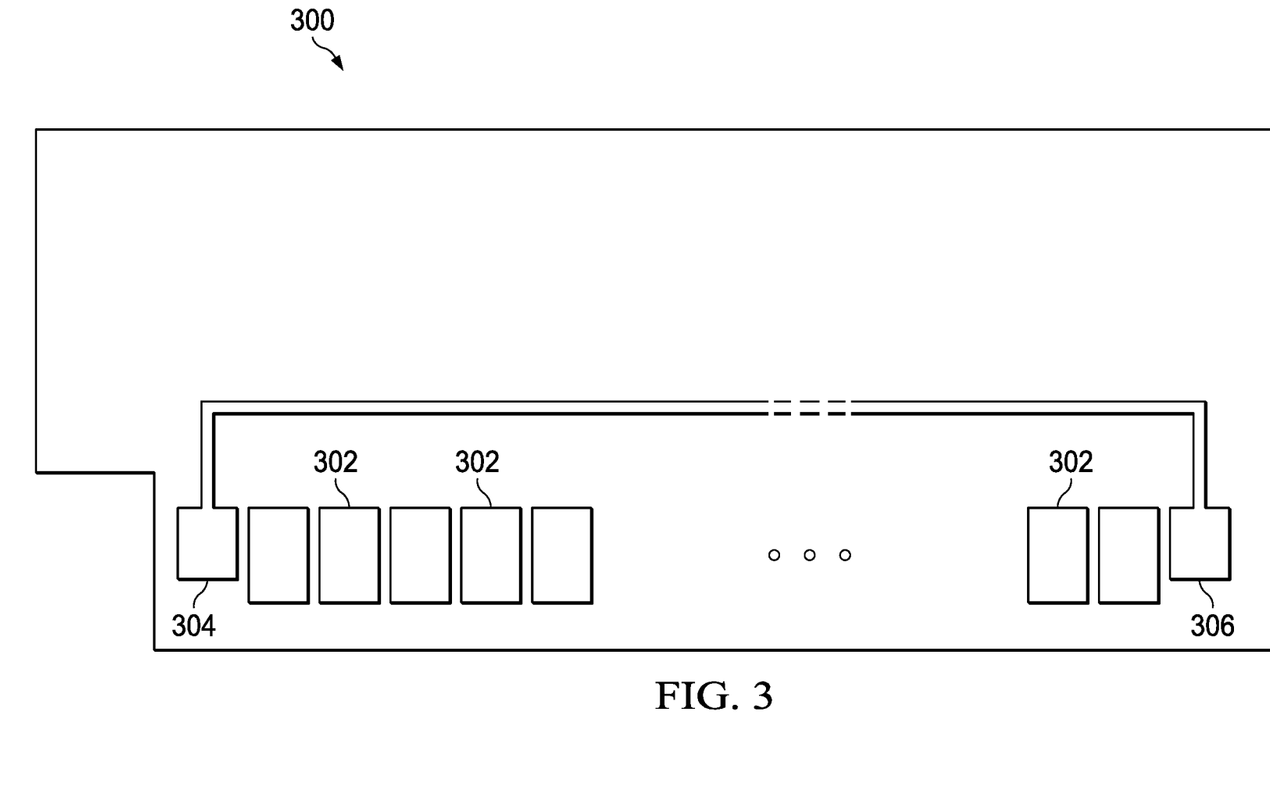
FIG. 3 illustrates an example PCIe device, in accordance with embodiments of the present disclosure.

FIG. 3 shows an example PCIe device 300, in accordance with some embodiments of this disclosure. Device 300 includes a plurality of connection pads 302 for transmitting data when it is inserted into a PCIe slot. Device 300 further includes a PRSNT1# pad 304 and a PRSNT2# pad 306. As one of ordinary skill in the art with the benefit of this disclosure will appreciate, PRSNT1# pad 304 and PRSNT2# pad 306 may be electrically coupled to one another through one or more circuit board traces on device 300. As shown, PRSNT1# pad 304 and PRSNT2# pad 306 may also be disposed farther from the card edge of device 300 than are the other pads 302, such that PRSNT1# pad 304 and PRSNT2# pad 306 may mate with corresponding pins in the PCIe slot only after it has been fully inserted (e.g., a "last mate first break" arrangement).

The logic level of the slot pin corresponding to PRSNT2# pad 306 may thus be determined by whether or not device 300 is inserted into the slot. For example, a PCIe slot may have the slot pin corresponding to PRSNT1# pad 304 pulled low (e.g., a logical 0 state). The slot pin corresponding to PRSNT2# pad 306 may ordinarily be in a logical 1 state or a floating voltage state, but when device 300 is inserted, the electrical connection between PRSNT1# pad 304 and PRSNT2# pad 306 within device 300 may pull the slot pin corresponding to PRSNT2# pad 306 down to a logical 0 state.

Thus the signal corresponding to PRSNT2# pad 306 may be used by the system to recognize the presence of device 300 in order to enable the auxiliary signals for pads 302. According to the PCIe Base Specification, a device such as device 300 should connect the PRSNT1# pad 304 to the farthest PRSNT2# pad 306 signal with a single trace in between them. For example, if device 300 is an ×1 add-in card, it would connect PRSNT1# pad 304 with PRSNT2# pad 306 on pin B17; an ×4 add-in card would connect PRSNT1# pad 304 with PRSNT2# pad 306 on pin B31; an ×8 add-in card would connect PRSNT1# pad 304 with PRSNT2# pad 306 on pin B48; and an ×16 add-in card would connect PRSNT1# pad 304 with PRSNT2# pad 306 on pin B81.

Accordingly, determining which PRSNT2# pin number is pulled low when a device is inserted provides a way of determining the lane width of device 300. Table 1 below summarizes the results of different types of devices being inserted into an ×16 PCIe slot.

TABLE 1

| B17 | B31 | B48 | B81 | Detected Device Type | Proper Bifurcation Mode |
|---|---|---|---|---|---|
| 1 | 1 | 1 | 1 | None | x4x4x4x4 |
| 0 | 1 | 1 | 1 | x1 device installed | x4x4x4x4 |
| 1 | 0 | 1 | 1 | x4 device installed | x4x4x4x4 |
| 1 | 1 | 0 | 1 | x8 device installed | x8x8 |
| 1 | 1 | 1 | 0 | x16 device installed | x16 |
| 1 | 0 | 0 | 1 | x8 device installed with an x4 link only | x4x4x4x4 |
| 1 | 1 | 0 | 0 | x16 device installed with an x8 link only | x8x8 |

Accordingly, embodiments of this disclosure may, in operation, check which pin has been pulled low, infer the width of the inserted device, and set the bifurcation mode accordingly. For example, if the PRSNT2# signal is detected on pin B81 of the slot, then the bifurcation mode may be set to ×16 and the system may be reset to allow the change to take effect.

For example, at a high level, one embodiment of this disclosure may proceed as follows. The PRSNT2# signal lines (e.g., pins B17, B31, B48 and B81) of a PCIe ×16 slot may be coupled to general purpose input/output (GPIO) pins of the platform controller hub (PCH) of a system. The value of one or more registers in the PCH reflecting the status of those 4 GPIO pins connected with the PRSNT2# signal of the PCIe slot may be read to check the respective logical states (or voltage levels). The link width of a PCIe device may then be determined by mapping the values that are read onto the truth table presented at Table 1 above to convert the values to the actual link width of the PCIe device that has been inserted. Then the PCIe bifurcation mode configuration may be adjusted in accordance with the determined link width, and the system may be reset to allow the setting change to take effect.

Figure 4:
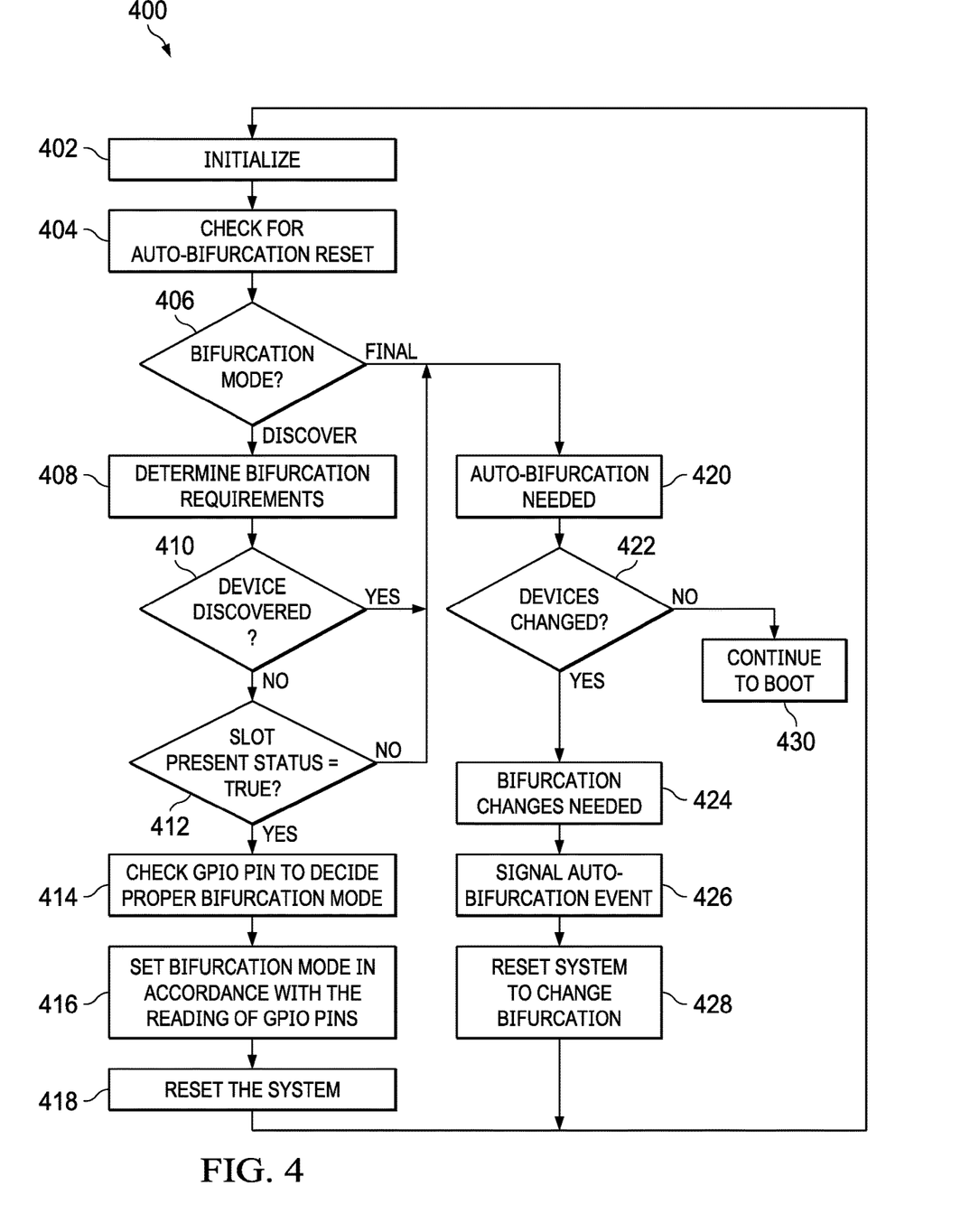
FIG. 4 illustrates a flow chart of a method, in accordance with embodiments of the present disclosure.

Turning now to FIG. 4, a flow chart of an example method 400 for automatic bifurcation is shown, in accordance with some embodiments. According to some embodiments, method 400 may begin at step 402. As noted above, teachings of the present disclosure may be implemented in a variety of configurations of information handling system 102. As such, the preferred initialization point for method 400 and the order of the steps comprising method 400 may depend on the implementation chosen.

At step 402, an information handling system is initialized. At step 404, the system determines whether it has been reset by an auto-bifurcation process to determine the bifurcation mode at step 406. If the bifurcation mode is set to a discovery mode, the method may proceed to step 408. If the bifurcation mode is set to a final mode, the method may instead proceed to step 420.

At step 408, bifurcation requirements are determined. In particular, if a device is discovered at step 410 or if the slot present status is not true at step 412, then the method may proceed to step 420. Otherwise, the method may proceed to step 414.

At step 414, the logical state (e.g., the voltage) of various pins may be determined. For example, such pins may be coupled to GPIO inputs of a PCH of the system. Based on the measured logical states, a determination may be made regarding what type of device (e.g., ×1, ×4, ×8, ×16, etc.) is present in the slot.

At step 416, the bifurcation mode for the slot may be set to a default that corresponds to the determined device type. At step 418, the system may be reset, and the method may return to step 402. However, upon the next iteration, at step 406 the bifurcation mode may be determined to be final, and the method may proceed to step 420 instead of step 408. At step 420, the auto-bifurcation process may begin. If no devices have changed at step 422, the method may proceed to step 430, and normal boot may continue.

If devices have changed, however, the process may continue to step 424. If bifurcation changes are needed at step 424, an auto-bifurcation event may be signaled at step 426, the system may be reset at step 428, and the method may return again to step 402.

Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented using information handling system 102 and/or any other system operable to implement method 400. In certain embodiments, method 400 may be implemented partially or fully in software and/or firmware embodied in computer-readable media.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor;
   a slot configured to receive an information handling resource and couple the information handling resource to a communications bus of the information handling system, wherein the communications bus is a Peripheral Component Interconnect Express (PCIe) bus; and
   a computer-readable medium having instructions thereon that are executable by the at least one processor for:
   determining logical states for a plurality of PRSNT2# pins of the slot, wherein the plurality of PRSNT2# pins of the slot are associated with a PRSNT2# signal, and wherein at least one of the plurality of PRSNT2# pins is electrically coupled to a pin associated with a PRSNT1# signal via a conductive trace on the information handling resource;
   based on which of the PRSNT2# pins have a logical zero state associated therewith, determining a communications width associated with an information handling resource received in the slot; and
   setting a bifurcation variable associated with the slot based on the determined communications width.

2. The information handling system of claim 1, wherein the instructions are further executable for restarting the information handling system after the setting.

3. The information handling system of claim 1, wherein the computer-readable medium includes a Basic Input/Output System (BIOS).

4. The information handling system of claim 1, wherein the determining the logical states comprises determining voltages.

5. The information handling system of claim 1, wherein the logical states are determined via a plurality of general purpose input/output (GPIO) pins of a platform controller hub of the information handling system.

6. The information handling system of claim 1, wherein a logical zero state associated with a B17 pin corresponds to a PCIe x1 information handling resource.

7. The information handling system of claim 6, wherein a logical zero state associated with a B31 pin corresponds to a PCIe x4 information handling resource.

8. The information handling system of claim 7, wherein a logical zero state associated with a B48 pin corresponds to a PCIe x8 information handling resource.

9. The information handling system of claim 8, wherein a logical zero state associated with a B81 pin corresponds to a PCIe x16 information handling resource.

10. The information handling system of claim 1, wherein the information handling resource does not implement PCIe lane reversal, and wherein the setting of the bifurcation variable is configured to prevent a failure of an automatic bifurcation with respect to the information handling resource.

11. A method comprising:
    an information handling system receiving an information handling resource in a slot that is configured to couple the information handling resource to a communications bus of the information handling system, wherein the communications bus is a Peripheral Component Interconnect Express (PCIe) bus;
    the information handling system determining logical states for a plurality of PRSNT2# pins of the slot, wherein the plurality of PRSNT2# pins of the slot are associated with a PRSNT2# signal, and wherein at least one of the plurality of PRSNT2# pins is electrically coupled to a pin associated with a PRSNT1# signal via a conductive trace on the information handling resource;
    based on which of the PRSNT2# pins have a logical zero state associated therewith, the information handling system determining a communications width associated with an information handling resource received in the slot; and
    the information handling system setting a bifurcation variable associated with the slot based on the determined communications width.

12. The method of claim 11, wherein:
    a logical zero state associated with a B17 pin corresponds to a PCIe x1 information handling resource, a logical zero state associated with a B31 pin corresponds to a PCIe x4 information handling resource, a logical zero state associated with a B48 pin corresponds to a PCIe x8 information handling resource, and a logical zero state associated with a B81 pin corresponds to a PCIe x16 information handling resource.

13. The method of claim 11, wherein the information handling resource does not implement PCIe lane reversal, and wherein the setting of the bifurcation variable is configured to prevent a failure of an automatic bifurcation with respect to the information handling resource.

14. An article of manufacture comprising a non-transitory, computer-readable medium having computer-executable code thereon that is executable by a processor for:
    in response to a slot coupled to the processor receiving an information handling resource in a slot that is configured to couple the information handling resource to a communications bus, determining logical states for a plurality of PRSNT2# pins of the slot, wherein the communications bus is a Peripheral Component Interconnect Express (PCIe) bus, wherein the plurality of PRSNT2# pins of the slot are associated with a PRSNT2# signal, and wherein at least one of the plurality of PRSNT2# pins is electrically coupled to a pin associated with a PRSNT1# signal via a conductive trace on the information handling resource;
    based on which of the PRSNT2# pins have a logical zero state associated therewith, determining a communications width associated with an information handling resource received in the slot; and
    setting a bifurcation variable associated with the slot based on the determined communications width.

15. The article of claim 14, wherein a logical zero state associated with a B17 pin corresponds to a PCIe x1 information handling resource.

16. The article of claim 14, wherein a logical zero state associated with a B31 pin corresponds to a PCIe x4 information handling resource.

17. The article of claim 14, wherein a logical zero state associated with a B48 pin corresponds to a PCIe ×8 information handling resource.

18. The article of claim 14, wherein a logical zero state associated with a B81 pin corresponds to a PCIe ×16 information handling resource.

19. The article of claim 14, wherein the information handling resource does not implement PCIe lane reversal, and wherein the setting of the bifurcation variable is configured to prevent a failure of an automatic bifurcation with respect to the information handling resource.

\* \* \* \* \*